US008952843B1

(12) United States Patent
West et al.

(10) Patent No.: US 8,952,843 B1
(45) Date of Patent: Feb. 10, 2015

(54) DIRECTIONAL AESA WITH INTERFEROMETER DIRECTION FINDING MODE

(75) Inventors: James B West, Cedar Rapids, IA (US); M. Wajih Elsallal, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 358 days.

(21) Appl. No.: 13/429,045

(22) Filed: Mar. 23, 2012

(51) Int. Cl.
*G01S 13/00* (2006.01)

(52) U.S. Cl.
USPC .......................................... 342/156

(58) Field of Classification Search
USPC .......................................... 342/156
See application file for complete search history.

(56) References Cited

U.S. PATENT DOCUMENTS

| 5,874,915 | A | * | 2/1999 | Lee et al. | 342/375 |
| 2007/0132642 | A1 | * | 6/2007 | Iluz et al. | 343/700 MS |
| 2008/0211726 | A1 | * | 9/2008 | Elsallal et al. | 343/770 |

* cited by examiner

*Primary Examiner* — Timothy A Brainard
(74) *Attorney, Agent, or Firm* — Angel N. Gerdzhikov; Donna P. Suchy; Daniel M. Barbieri

(57) ABSTRACT

A multi-functional reconfigurable radar system and a method for configuring such a radar system are disclosed. The multi-functional reconfigurable radar system that is operable as a directional antenna or a DF interferometer. The antenna system in accordance with the present disclosure may be installed on a size-constrained platform such as an unmanned aerial vehicle (UAV) and utilized as a common shared asset aperture for intelligence-gathering, electronic countermeasure, self-protection, electronic support, electronic attack as well as direction finding and the like.

20 Claims, 5 Drawing Sheets

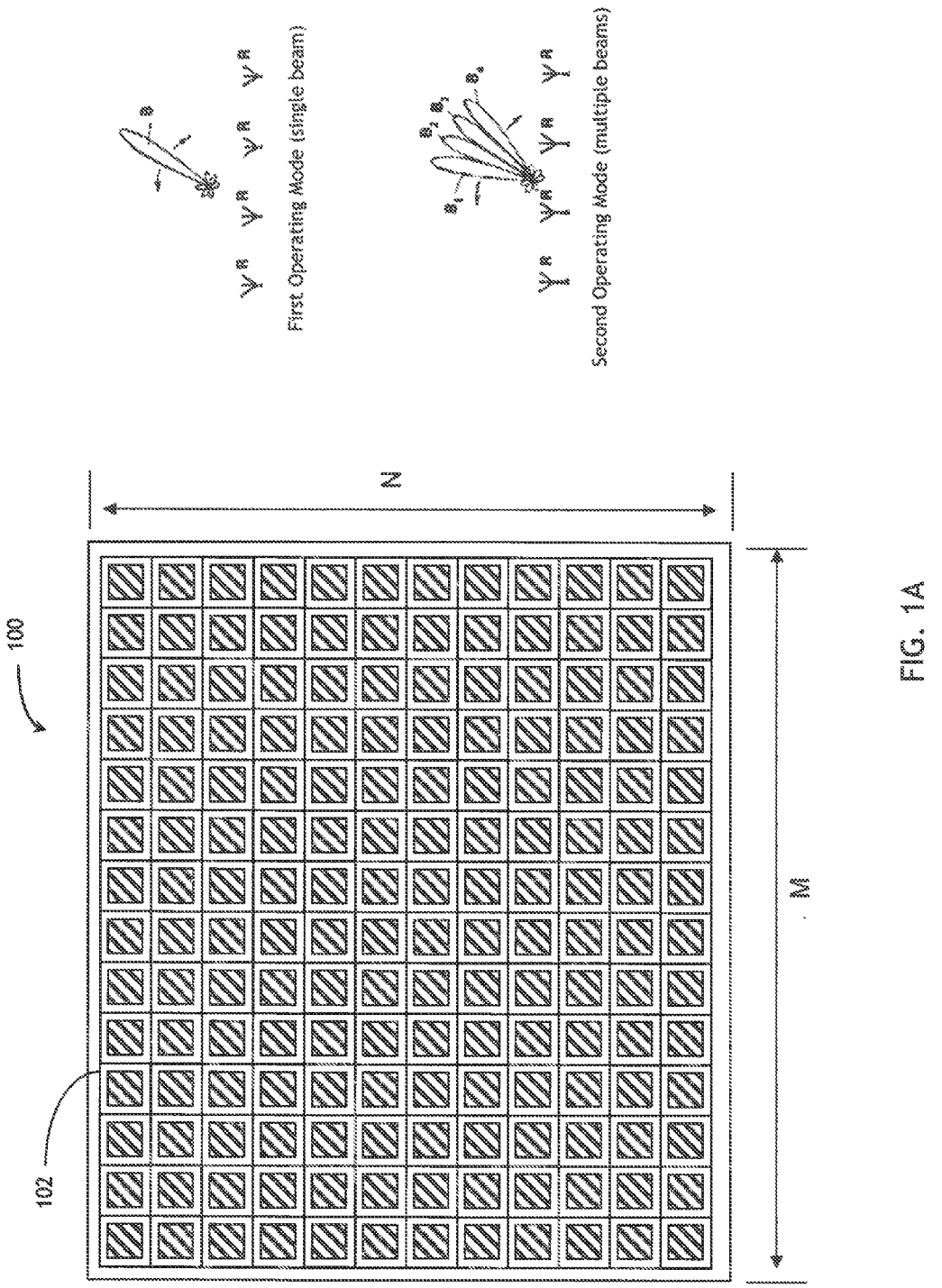

US 8,952,843 B1

DIRECTIONAL AESA WITH INTERFEROMETER DIRECTION FINDING MODE

TECHNICAL FIELD

The present disclosure relates generally to radar systems and more particularly to a direction finding applications.

BACKGROUND

Modern radar systems may utilize various types of antennas to provide a variety of functions. Such functions may include, for example, intelligence-gathering (e.g., signals intelligence, or SIGINT), direction finding (DF), electronic countermeasure (ECM) or self-protection (ESP), electronic support (ES), electronic attack (EA) and the like. Providing such multi-function capability from a single aperture to modern platforms is becoming an essential requirement. However, due to the limited space available on size-constrained platforms such an unmanned aerial vehicle (UAV), placing the various types of antennas is becoming a challenge.

It is contemplated that certain functions may be provided utilizing shared hardware resources. For instance, ECM and EA applications or the like may share the same directional antenna system in order to reduce the number of antenna systems required on the platform. However, some applications such as direction finding (DF) cannot utilize the conventional directional antenna system because they require significantly different architecture or radiation pattern. Therefore, a separate DF interferometer antenna arrays would be required in order to facilitate direction finding for the small platforms.

Therein lies the need to provide a common shared asset aperture that may be utilized as a directional antenna or a DF interferometer.

SUMMARY

The present disclosure is directed to a multi-functional reconfigurable radar system. The radar system may include having an array of end-fire radiating elements. A plurality of subarrays may be defined within the array of end-fire radiating elements. A controller of the radar system may be configured for selectively activating at least one of: the array of end-fire radiating elements, including the plurality of subarrays, allowing the reconfigurable radar system to be utilized as a directional antenna; or solely the plurality of BAVA subarrays, allowing the reconfigurable radar system to be utilized as a direction finding (DF) interferometer.

A further embodiment of the present disclosure is directed to a reconfigurable radar system. The radar system may include a radar panel having an array of end-fire radiating elements. A plurality of subarrays may be defined within the array of end-fire radiating elements. The radar system may also include a plurality of direction finding (DF) receivers. Each of the plurality of DF receivers may correspond to one of the plurality of subarrays. A reconfigurable RF switching network may be configured for at least one of: directing signals from the array of end-fire radiating elements to a directional manifold, allowing the reconfigurable radar system to be utilized as a directional antenna; or directing signals from each of the plurality of subarrays to its corresponding DF receiver, allowing the reconfigurable radar system to be utilized as a DF interferometer.

An additional embodiment of the present disclosure is directed to a method for configuring a multi-functional radar system. The method may include providing an array of end-fire radiating elements; defining a plurality of subarrays within the array of end-fire radiating elements; providing a corresponding direction finding (DF) receiver for each of the plurality of subarrays; and selectively activating at least one of: the full array of end-fire radiating elements, including the plurality of subarrays, and utilizing the multi-functional radar system as a directional antenna; or solely the plurality of subarrays, and utilizing the multi-functional radar system as a DF interferometer.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIGS. 1A and 1B are illustrations depicting a multi-functional reconfigurable antenna system operable in more than one mode;

DETAILED DESCRIPTION

Reference will now be made in detail to exemplary embodiments of the disclosure, examples of which are illustrated in the accompanying drawings.

The present disclosure is directed to a multi-functional reconfigurable antenna system that is operable as a directional antenna or a DF interferometer. The antenna system in accordance with the present disclosure may be installed on a size-constrained platform such as an unmanned aerial vehicle (UAV) and utilized as a common shared asset aperture for intelligence-gathering, electronic countermeasure, self-protection, electronic support, electronic attack as well as direction finding and the like.

Figure 1B:
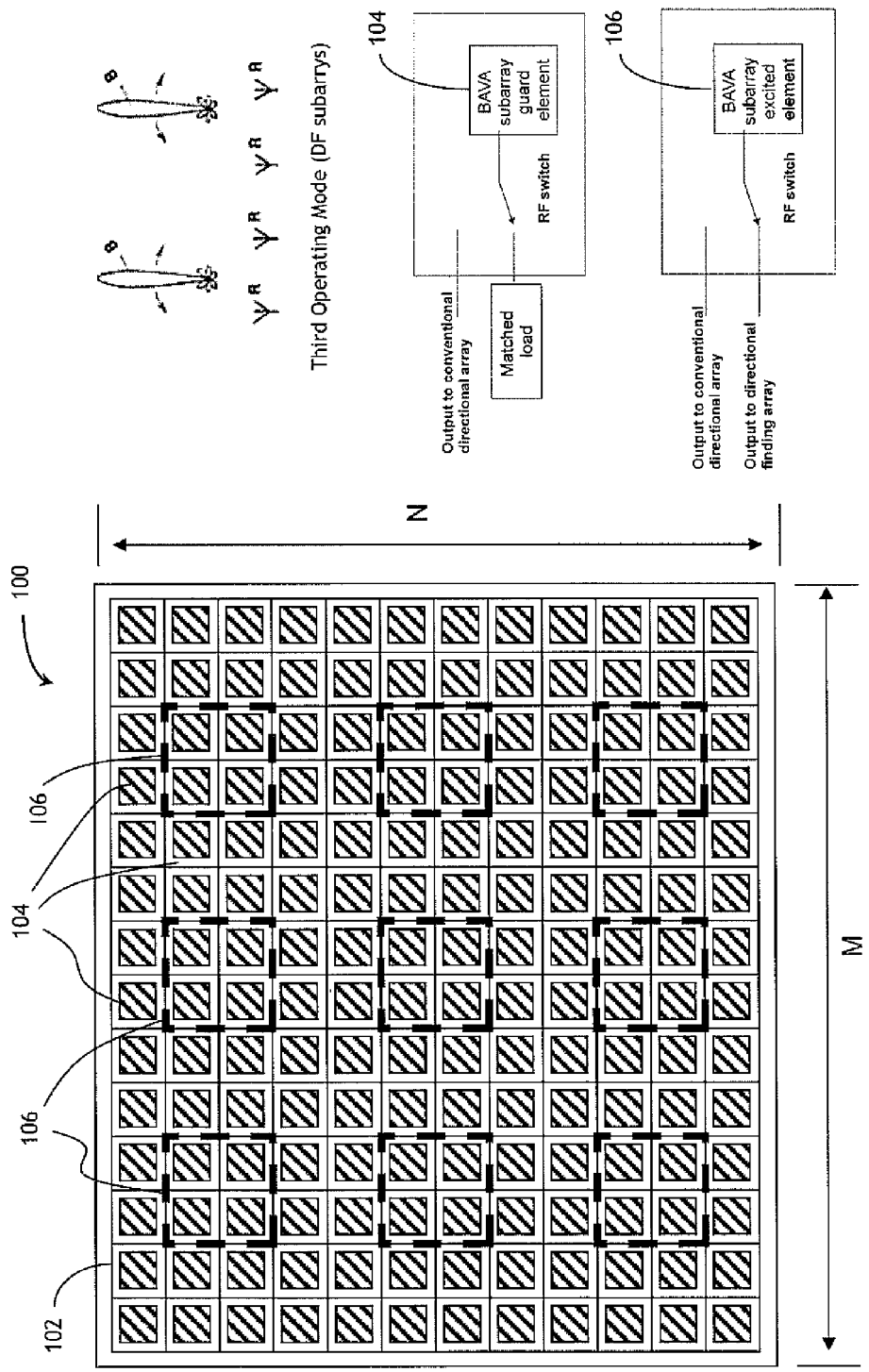

Referring to FIGS. 1A and 1B, illustrations depicting a multi-functional reconfigurable antenna system 100 are shown. In one embodiment, the antenna system 100 may include an end-fire radiating elements array such as the Balanced Antipodal Vivaldi Antenna (BAVA) array 102. The BAVA array 102 forms an Active Electronically Scanned Array (AESA, also known as active phased array radar) panel, which is a type of phased array radar whose transmitter and receiver functions are composed of numerous small solid-state transmit/receive elements. The BAVA array 102 referenced in the present disclosure therefore refers to an AESA composed of Balanced Antipodal Vivaldi Antennas.

Balanced Antipodal Vivaldi Antennas (BAVA) were first introduced by Langely, Hall and Newman (J. D. Langely et al, "Balanced Antipodal Vivaldi Antenna for Wide Bandwidth Phased Arrays," IEEE Proceeding of Microwave and Antenna Propagations, Vol. 143, No. 2, April 1996, pp. 97-102). However, it is contemplated that variations of such antennas since its first introduction may also be utilized to form the AESA without departing from the spirit and scope of the present disclosure. In addition, the radiating elements utilized to form the array may be dual polarized.

In one embodiment, the BAVA array 102 forms a generally rectangular radar panel (antenna aperture) having M by N elements. The BAVA elements within the array 102 may be located in a lattice spacing to avoid grating lobes at desired scan-angles. For example, they may be spaced ½ wavelength with a rectangular grid at the highest operating frequency. It is contemplated that a directional array may contain tens, hundreds or thousands of BAVA radiating elements. The specific number BAVA radiating elements included in the BAVA array 102 may be determined based on specific system requirements. In addition, it is contemplated that the antenna aperture formed by the BAVA array 102 is not required to be generally rectangular.

The BAVA array 102 in the configuration as depicted in FIG. 1A allows the antenna system 100 to be utilized as a directional antenna. For instance, all elements in the BAVA array 102 may be activated/energized as a whole to provide a sum/delta single beam (similar to that of a conventional AESA panel). Such an operating mode may be referred to as the first operating mode of the antenna system 100. In addition, the antenna system 100 may provide dual or multiple beams from the same aperture (i.e., the antenna aperture formed by the full BAVA array 102). Multiple beams sharing the same aperture may be referred to as the second operating mode of the antenna system 100. In this manner, when all elements in the BAVA array 102 are excited, the antenna system 100 may be utilized as a directional antenna to either provide a sum/delta single beam (i.e., the first operating mode) or multiple beams from the same aperture (i.e., the second operating mode). It is contemplated that the antenna system 100 may operate in the first or second operating mode based on the configuration of the feed network that excites the radiating elements of the BAVA array 102.

The operation of the BAVA array 102 in accordance with the present disclosure may also be reconfigured from the directional mode (as described above) to a multi-element direction finding mode using RF switches. FIG. 1B depicts the reconfigured BAVA array 102 that allows the antenna system 100 to be utilized as a direction finding (DF) interferometer (may be referred to as the third operating mode of the antenna system 100). As illustrated in FIG. 1B, RF switching networks allow BAVA subarrays 106 to be defined within the collection of BAVA elements that are a part of the BAVA array 102. In this manner, when the antenna system 100 operates in the third operating mode, the BAVA subarrays 106 may be activated/energized while the rest of the elements in the BAVA array 102 may serve as guard elements 104. It is contemplated that the guard elements 104 may be passively terminated in matched load impedance by means of RF switching.

In the exemplary configuration illustrated in FIG. 1B, eight 2×2 BAVA subarrays 106 are defined within the collection of BAVA elements that are a part of the BAVA array 102. The RF switching network may direct the output of each BAVA subarray 106 to a corresponding DF receiver. In this manner, multiple beams from various portions of the antenna panel may be provided to their corresponding DF receivers for interferometer-based Direction-of-Arrival (DOA) determination. It is contemplated that any interferometer-based DOA algorithms may be utilized to provide direction finding functions. Furthermore, it is contemplated that various types of DF receivers may also be utilized without departing from the spirit and scope of the present disclosure.

It is understood that the specific number of elements included in each BAVA subarray may vary from the 2×2 configuration described above. In addition, the number of BAVA subarrays defined within the radar panel may differ from the exemplary configuration described above as well. Furthermore, it is contemplated that the radar panel may be divided into two or more portions, wherein one portion of the radar panel may be utilized as a directional aperture, while the other portion may be utilized as a directional finding array.

As previously mentioned, a reconfigurable RF switching network may be utilized to provide the reconfigurable operating modes of the antenna system 100. For instance, when the antenna system 100 is configured to operate as a directional antenna, the RF switching network may be configured to direct signals from the full BAVA array 102, including the plurality of BAVA subarrays, to a directional manifold in a manner similar to that of a conventional directional antenna. On the other hand, when the antenna system 100 is configured to operate as a DF interferometer, the RF switching network may direct signals from each of the plurality of BAVA subarrays 106 to its corresponding DF receiver (as opposed to the directional manifold in the first and second operating modes).

Figure 2:
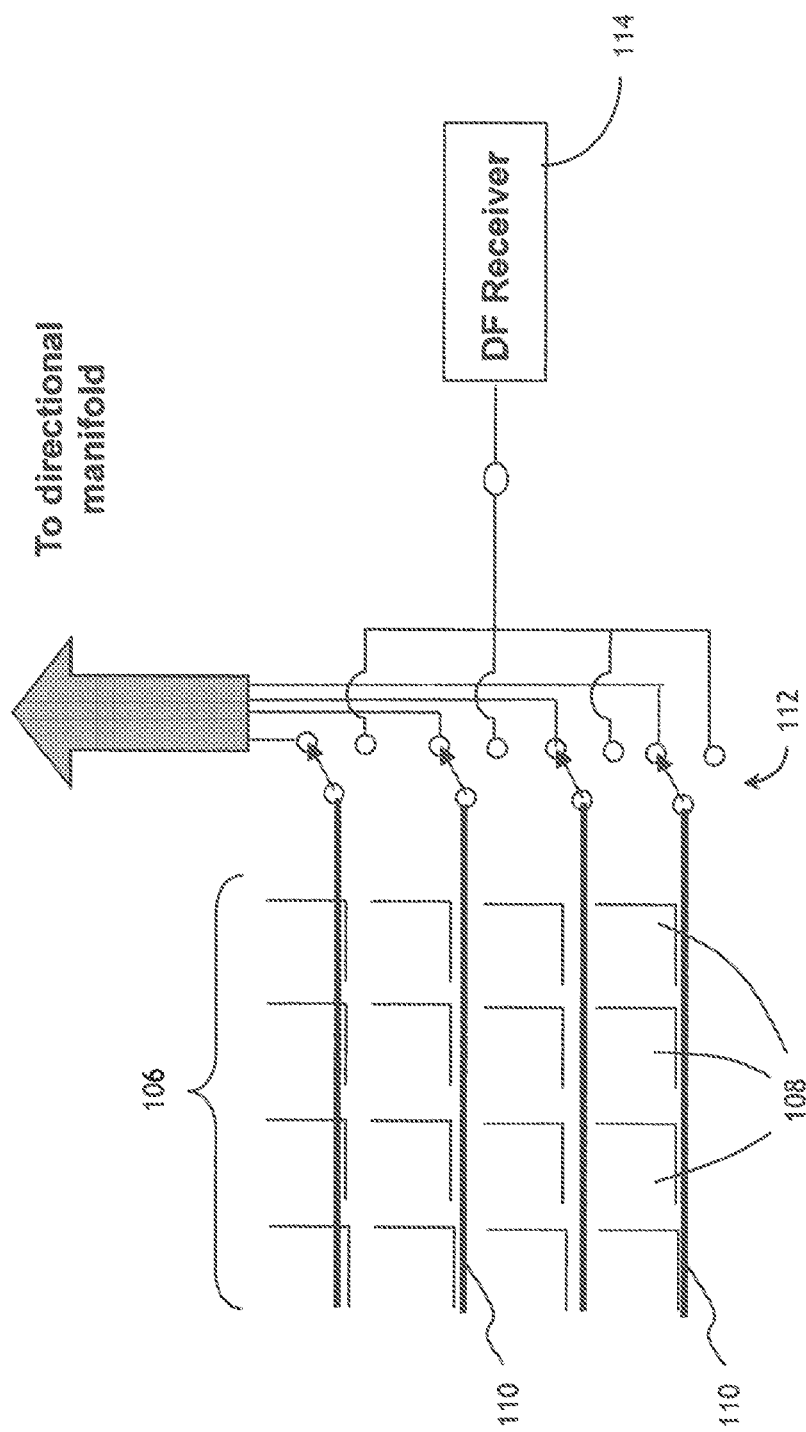
FIG. 2 is an illustration depicting a portion of a RF switching network, wherein the circuit is configured for directional antenna system.

Referring to FIG. 2, a block diagram depicting a portion of the RF switching network is shown. Each BAVA subarrays 106 may include m×n radiating elements 108 (where m, n≥2). An RF feed 110 may be provided for each row of the radiating elements 108 in the BAVA subarray 106, and each RF feed 110 may be connected to the feed switching network 112. In this manner, when the antenna system 100 is configured to operate as a directional antenna, signals from the radiating elements of the BAVA subarrays 106 (and the rest of the BAVA array) are directed to the directional manifold for processing, allowing the antenna system 100 to be utilized as a directional antenna.

Figure 3:
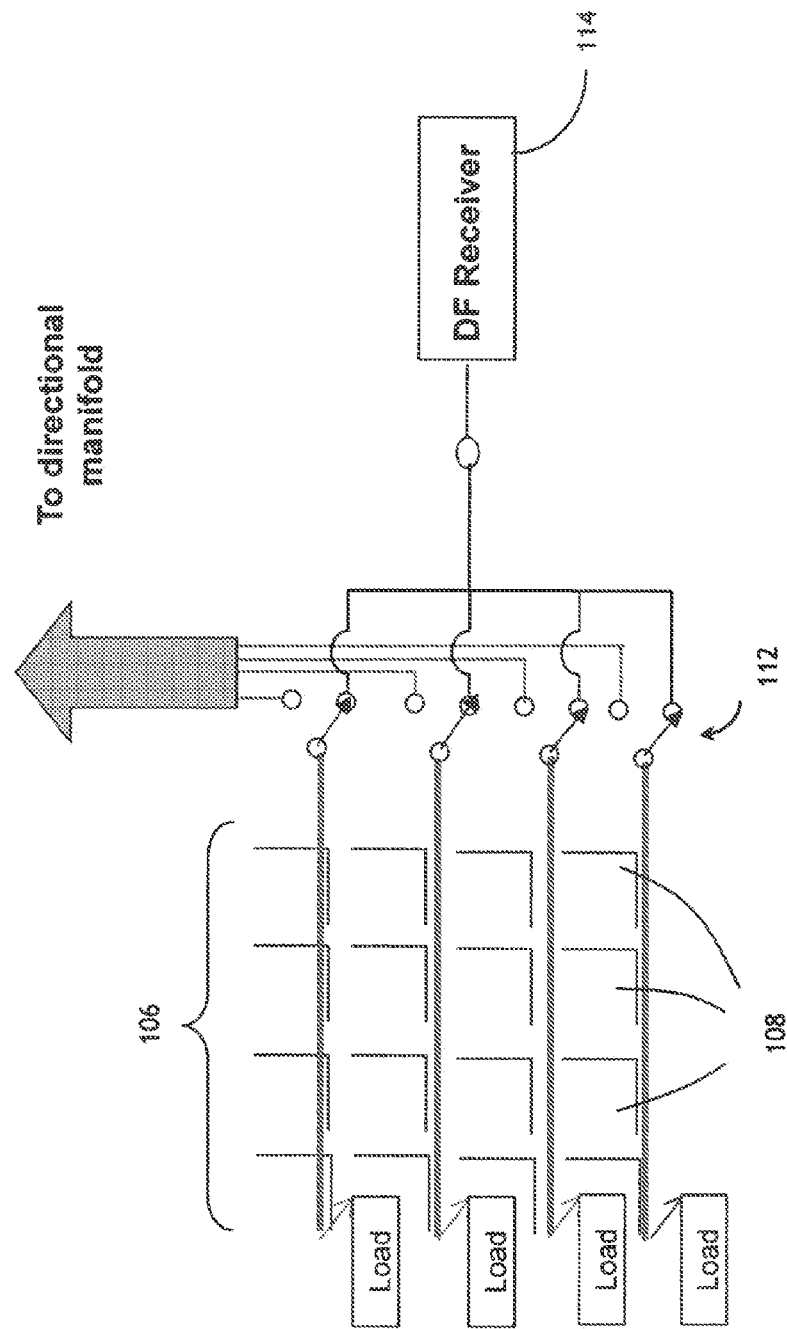
FIG. 3 is an illustration depicting a portion of the RF switching network, wherein the circuit is configured to feed an array of DF interferometer antenna system.

On the other hand, when the antenna system 100 is configured to operate as a DF interferometer, the switches 112 (microelectromechanical switches (MEMS) or other high performance RF switches) may change state and direct the signals from the RF feed 110 to a DF receiver 114 that corresponds to each BAVA subarray 106, as illustrated in FIG. 3. Since the BAVA subarrays 106 are located apart from each other, and each BAVA subarray 106 has an electromagnetic response very close to that of a traditional spiral antenna, the BAVA subarrays 106 effectively form DF interferometer antenna arrays, allowing the antenna system 100 to be utilized as a DF interferometer. It is understood that when the antenna system 100 is operating in this operating mode, the rest of the elements that are not a part of BAVA subarrays 106, as well as system components that are not associated with direction finding functions, may be disengaged or turned off. Similarly, when the antenna system 100 is operating as a directional antenna, the DF receivers 114 may be disengaged or turned off as well.

It is understood that the RF switching network depicted in FIGS. 2 and 3 are merely exemplary, and the RF feed and the switches may be positioned differently without departing from the spirit and scope of the present disclosure. For instance, the RF feed 110 is not required to be orientated horizontally as depicted in FIGS. 2 and 3, and an alternative RF feed may be oriented vertically. Furthermore, both the horizontal and the vertical feed may be utilized to form an orthogonal DF feed (with additional switches to facilitate mode switching), which may be appreciated in certain applications.

It is also understood that while the BAVA subarrays defined in the same AESA panel may have the same number of radiating elements (e.g., the BAVA subarrays defined in the same antenna panel may all be of the same dimension m×n), such a configuration is not required. In certain configurations, the BAVA subarrays defined in the same antenna panel may vary in size/dimension without departing from the spirit and scope of the present disclosure.

Furthermore, it is contemplated that the antenna system 100 in accordance with the present disclosure may operate in a fourth operational mode, where both a directional and DF mode exist simultaneously. For instance, the DF interferometer antenna arrays may be formed as illustrated in FIG. 1B. However, instead of terminating all of the non-DF elements, they may be configured to operate as a directional antenna with "holes" in it (i.e., in the areas where the DF antennas are configured). The directional antenna provided in this operating mode may not perform as well as the directional mode described previously, however, it allows a simultaneous directional (with some degradation) and DF mode of operation, which may be appreciated in certain applications.

Figure 4:
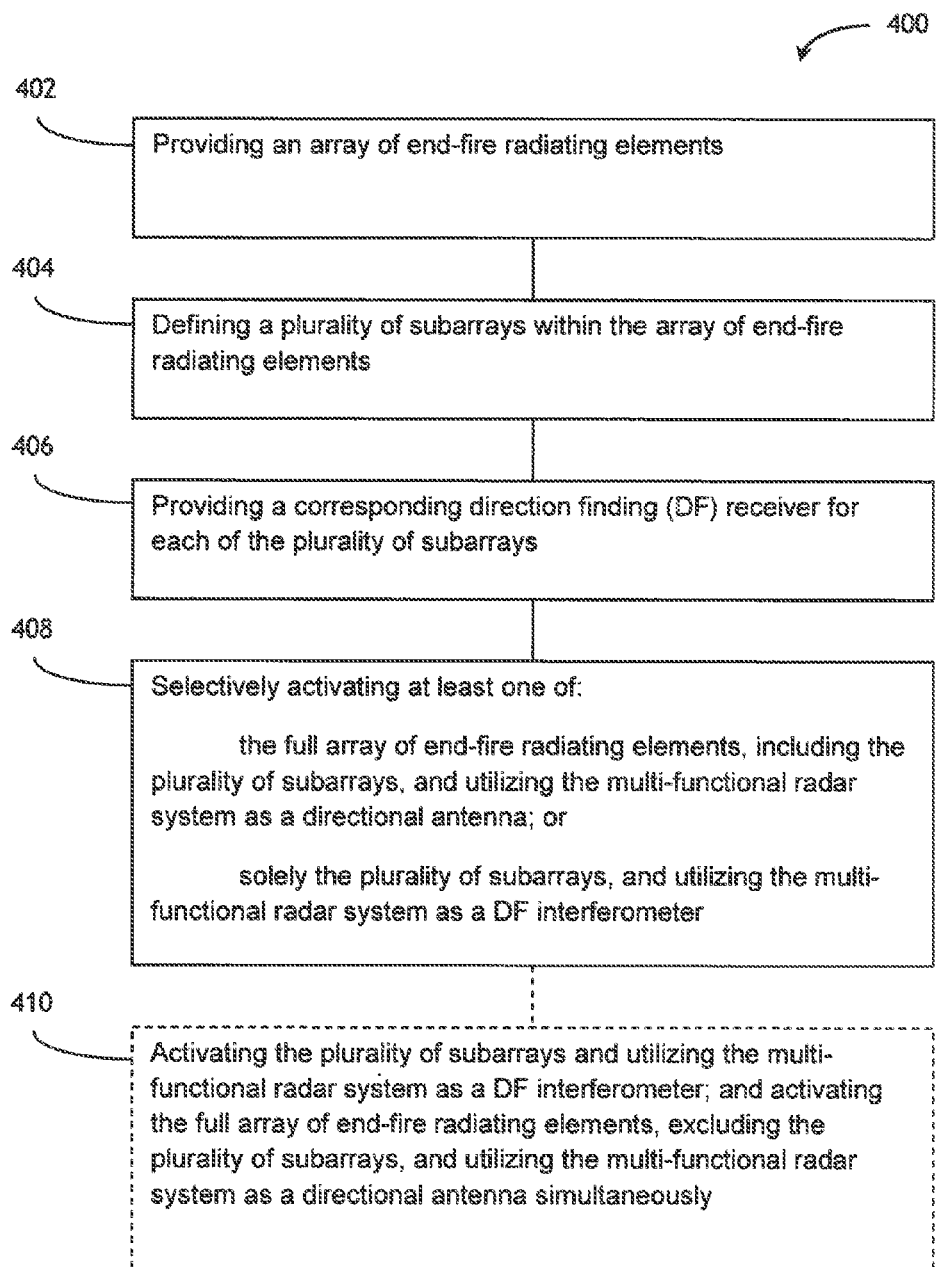
FIG. 4 is a flow chart illustrating a method for configuring a multi-functional radar system, wherein the radar system can be utilized as a directional antenna or a DF interferometer.

Referring now to FIG. 4, a method 400 for configuring a multi-functional radar system is shown. Step 402 may provide a BAVA array that forms an AESA as described above. Step 404 may define a plurality of BAVA subarrays within the larger BAVA array. Step 406 may then associate each of the plurality of BAVA subarrays with a DF receiver by means of switching networks. Step 408 may selectively activate the entire BAVA array, including the plurality of BAVA subarrays, allowing the radar system to be utilized as a directional antenna. Step 408 may also selectively activate only the plurality of BAVA subarrays and utilize them as DF interferometer antenna arrays, therefore allowing the radar system to be utilized as a DF interferometer.

It is contemplated that when the radar system is utilized as a DF interferometer, the rest of the elements in the BAVA array that surround the plurality of BAVA subarrays may be passively terminated in matched load impedance by means of RF switching and serve as guard elements for the BAVA subarrays. Alternatively, as step 410 indicates, the rest of the elements in the BAVA array that surround the plurality of BAVA subarrays may still be utilized jointly as a directional aperture if desired. While the directional aperture operating in this manner may not perform as well as the directional mode described above, it nevertheless allows a simultaneous directional (with some degradation) and DF mode of operation, which may be appreciated in certain applications.

The system and method in accordance with the present disclosure provide a compact AESA panel that may be utilized as a shared hardware resource for a variety of functions. When utilized as a directional antenna, the AESA panel as described above is capable of providing a 10:1 bandwidth or greater. The AESA panel may also be reconfigured into multiple subarrays (serving as spiral-like antenna arrays) to provide up to 10:1 bandwidth interferometer-based direction finding. Such an AESA panel may therefore be installed on an unmanned aerial vehicle or the like, and utilized as a common shared asset aperture for intelligence-gathering, electronic countermeasure, self-protection, electronic support, electronic attack as well as direction finding and the like.

It is understood that the present invention is not limited to any underlying implementing technology. The present invention may be implemented utilizing any combination of software and hardware technology. The present invention may be implemented using a variety of technologies without departing from the scope and spirit of the invention or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A multi-functional reconfigurable radar system, comprising:
   a radar panel, the radar panel including an array of end-fire radiating elements;
   a plurality of subarrays of end-fire radiating elements defined within the array of end-fire radiating elements; and
   a controller configured for providing switching between:
      the array of end-fire radiating elements, including the plurality of subarrays of end-fire radiating elements, allowing the reconfigurable radar system to be utilized as a directional antenna; and
      solely the plurality of subarrays of end-fire radiating elements, allowing the reconfigurable radar system to be utilized as a direction finding (DF) interferometer.

2. The multi-functional reconfigurable radar system of claim 1, further comprising:
   a plurality of DF receivers, each of the plurality of DF receivers corresponding to one of the plurality of subarrays of end-fire radiating elements; and
   a reconfigurable RF switching network, the reconfigurable RF switching network configured for at least one of:
      directing signals from the array of end-fire radiating elements to a directional manifold when the reconfigurable radar system is utilized as the directional antenna; or
      directing signals from each of the plurality of subarrays of end-fire radiating elements to its corresponding DF receiver when the reconfigurable radar system is utilized as the DF interferometer.

3. The multi-functional reconfigurable radar system of claim 2, wherein the reconfigurable RF switching network is further configured for terminating radiating elements of the radar panel that are not a part of the plurality of subarrays of end-fire radiating elements utilizing matched load impedance when the reconfigurable radar system is utilized as the DF interferometer.

4. The multi-functional reconfigurable radar system of claim 2, wherein the reconfigurable RF switching network is further configured for:
   directing signals from each of the plurality of subarrays of end-fire radiating elements to its corresponding DF receiver;
   directing signals from the array of end-fire radiating elements, excluding the plurality of subarrays of end-fire radiating elements, to the directional manifold; and configuring the reconfigurable radar system to be utilized simultaneously as the DF interferometer and the directional antenna.

5. The multi-functional reconfigurable radar system of claim 1, wherein the array of end-fire radiating elements includes a Balanced Antipodal Vivaldi Antenna (BAVA) array.

6. The multi-functional reconfigurable radar system of claim 1, wherein the array of end-fire radiating elements are positioned in a generally rectangular grid.

7. The multi-functional reconfigurable radar system of claim 6, wherein two adjacent radiating elements of the array of end-fire radiating elements are spaced apart by approximately ½ wavelength of a highest operating frequency.

8. A reconfigurable radar system, comprising:
a radar panel, the radar panel including an array of end-fire radiating elements;
a plurality of subarrays of end-fire radiating elements defined within the array of end-fire radiating elements;
a plurality of direction finding (DF) receivers, each of the plurality of DF receivers corresponding to one of the plurality of subarrays of end-fire radiating elements; and
a reconfigurable RF switching network, the reconfigurable RF switching network configured for at least one of:
directing signals from the array of end-fire radiating elements to a directional manifold, allowing the reconfigurable radar system to be utilized as a directional antenna; and
directing signals from each of the plurality of subarrays of end-fire radiating elements to its corresponding DF receiver, allowing the reconfigurable radar system to be utilized as a DF interferometer.

9. The reconfigurable radar system of claim 8, wherein the reconfigurable RF switching network is further configured for terminating radiating elements of the radar panel that are not a part of the plurality of subarrays of end-fire radiating elements utilizing matched load impedance when the reconfigurable radar system is utilized as the DF interferometer.

10. The reconfigurable radar system of claim 8, wherein the array of end-fire radiating elements includes a Balanced Antipodal Vivaldi Antenna (BAVA) array.

11. The reconfigurable radar system of claim 8, wherein same radiating elements are utilized for the array of end-fire radiating elements, including the plurality of subarrays of end-fire radiating elements.

12. The reconfigurable radar system of claim 8, wherein the reconfigurable RF switching network is further configured for:
directing signals from each of the plurality of subarrays of end-fire radiating elements to its corresponding DF receiver;
directing signals from the array of end-fire radiating elements, excluding the plurality of subarrays of end-fire radiating elements, to the directional manifold; and
configuring the reconfigurable radar system to be utilized simultaneously as the DF interferometer and the directional antenna.

13. The reconfigurable radar system of claim 8, wherein the array of end-fire radiating elements are positioned in a generally rectangular grid.

14. A method for configuring a multi-functional radar system, the method comprising:
providing an array of end-fire radiating elements;
defining a plurality of subarrays of end-fire radiating elements within the array of end-fire radiating elements;
providing a corresponding direction finding (DF) receiver for each of the plurality of subarrays of end-fire radiating elements; and
selectively activating at least one of:
the full array of end-fire radiating elements, including the plurality of subarrays of end-fire radiating elements, and utilizing the multi-functional radar system as a directional antenna; and
solely the plurality of subarrays of end-fire radiating elements, and utilizing the multi-functional radar system as a DF interferometer.

15. The method of claim 14, further comprising: directing signals from the array of end-fire radiating elements to a directional manifold when the multi-functional radar system is utilized as the directional antenna.

16. The method of claim 14, further comprising: directing signals from each of the plurality of subarrays of end-fire radiating elements to its corresponding DF receiver when the multi-functional radar system is utilized as the DF interferometer.

17. The method of claim 16, further comprising: terminating radiating elements of the array of end-fire radiating elements that are not a part of the plurality of subarrays of end-fire radiating elements utilizing matched load impedance when the multi-functional radar system is utilized as the DF interferometer.

18. The method of claim 14, wherein the array of end-fire radiating elements includes a Balanced Antipodal Vivaldi Antenna (BAVA) array.

19. The method of claim 14, further comprising:
activating the plurality of subarrays of end-fire radiating elements to function as the DF interferometer;
activating the full array of end-fire radiating elements, excluding the plurality of subarrays of end-fire radiating elements, to function as the directional antenna; and
utilizing the multi-functional radar system simultaneously as the DF interferometer and the directional antenna.

20. The method of claim 14, wherein the array of end-fire radiating elements are positioned in a generally rectangular grid, and two adjacent radiating elements of the array of end-fire radiating elements are spaced apart by approximately ½ wavelength of a highest operating frequency.

* * * * *